United States Patent [19]

Grimes et al.

[11] Patent Number: 5,034,944
[45] Date of Patent: Jul. 23, 1991

[54] OPTICAL FIBER BUS CONTROLLER

[75] Inventors: Gary J. Grimes, Thornton; Lawrence J. Haas, Broomfield; Jon R. Sauer, Aurora, all of Colo.

[73] Assignee: AT&T Bell Laboratories, Murray Hill, N.J.

[21] Appl. No.: 265,424

[22] Filed: Oct. 31, 1988

[51] Int. Cl.$^5$ .............................................. H04J 14/08
[52] U.S. Cl. ........................................ 370/4; 455/608; 455/617
[58] Field of Search ............................... 455/608–610, 455/617, 618, 619; 370/1, 3, 4

[56] References Cited

U.S. PATENT DOCUMENTS

| | | | |
|---|---|---|---|
| 4,400,778 | 8/1983 | Vivian et al. | 364/200 |
| 4,406,004 | 9/1983 | Hall | 370/15 |
| 4,430,731 | 2/1984 | Gimple | 370/112 |
| 4,510,451 | 4/1985 | Longmire | 455/610 |
| 4,612,671 | 9/1980 | Giles | 455/613 |
| 4,733,093 | 3/1988 | Graves et al. | 250/551 |
| 4,768,854 | 9/1988 | Campbell et al. | 350/96.16 |
| 4,811,338 | 3/1989 | Haruyama | 370/85.2 |
| 4,868,809 | 9/1989 | Kahn | 455/608 |

FOREIGN PATENT DOCUMENTS 0251484 7/1988 European Pat. Off. .

OTHER PUBLICATIONS

T. Tamura, "Optical Cascade Star Network—A New Configuration for a Passive Distribution System with Optical Collision Detection Capability", IEEE, *Journal of Lightwave Technology*, vol. LT-2, No. 1, Feb. 1984, pp. 61-65.

*Primary Examiner*—Reinhard J. Eisenzopf
*Assistant Examiner*—L. Van Beek
*Attorney, Agent, or Firm*—John C. Moran

[57] ABSTRACT

Apparatus for controlling the transition of a number of lasers that are transmitting light to an optical bus from an off state to a sub-threshold bias state so as to minimize the transmission of light from lasers in the sub-threshold bias state. The apparatus places each laser in the sub-threshold bias state a predetermined time before it is to transmit data to the bus; and then, the apparatus places each laser in the off state after the data transmission has occurred. The lasers transmit in a sequential order onto the optical bus.

12 Claims, 5 Drawing Sheets

SYSTEM 100

OPTICAL FIBER BUS CONTROLLER

TECHNICAL FIELD

This invention relates to optical fiber buses and in particular to the control of the lasers or light emitting diodes (LEDs) used to transmit information on those buses.

BACKGROUND OF THE INVENTION

The use of an optical fiber bus to interconnect electronic subsystems such as computers in a multi-processor system or switching units in a communication system offers high data rate transmission and eliminates the electrical coupling noise problems of electrical transmission subsystems. In order to achieve the high data rate, it is necessary to rapidly turn on and off the lasers or LEDs that are driving the optical fiber bus. A laser can be turned on from a sub-threshold bias or biased state at extremely high speeds but have a relatively slow turn-on time from an off state. The sub-threshold bias state is an intermediate state between the on and off states in which a laser only emits a small amount of light. Similarly, a laser can be switched to a sub-threshold bias state much more rapidly than it can be returned to a totally off state. Because of this characteristic, lasers are operated by leaving them in the biased state and by pulsing them to the on state and back to biased state to communicate data. This technique works extremely well where only one laser is driving an optical fiber.

A problem arises in a system where a number of lasers are driving a optical fiber bus since in the biased state each laser emits a small amount of light. The light output from the lasers in the biased state is summed on the bus and many reach an intensity where one laser's output in the on state cannot be detected because it is masked by the summed outputs of the lasers in the biased state. Similarly, in order for LEDs to turn on rapidly, they also must be biased to a point where they are emitting light.

SUMMARY OF THE INVENTION

These problems are solved and an innovation and a departure in the art is achieved by an apparatus and method which allows full utilization of lasers or LEDs to drive a common optical fiber bus by cycling each from the off state of the biased state a predetermined time before each must be used to place data onto the optical fiber bus and then cycling each of the off state after the data transmission has occurred.

Advantageously, a plurality of terminals are connected to the optical fiber bus, and each terminal transmits data on the optical fiber bus during a designated time period called a time slot. A bus controller generates time slot number signals that designate each time slot. Each terminal has a transmitter which advantageously may be either a laser or a light emitting diode and a decoding circuit for detecting the immediately preceding time slot to each terminal's time slot to transfer each terminal's laser from the off state to the immediate or biased state in response to the time slot number signals.

Also, the decoding circuit comprises a first comparator for detecting the immediately preceding time slot in response to a stored number representing that time slot and the time slot number signals. Upon detecting the preceding time slot, the first comparator generates a match signal. The decoding circuit further comprises an adder for incrementing the stored number and a second comparator responsive to the incremented stored number and the time slot number signals to detect each terminal's time slot. Upon detection of each terminal's time slot, the second comparator generates a match signal. The decoding circuit further comprises a laser control circuit responsive to either match signal to enable each terminal's laser into the biased state.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
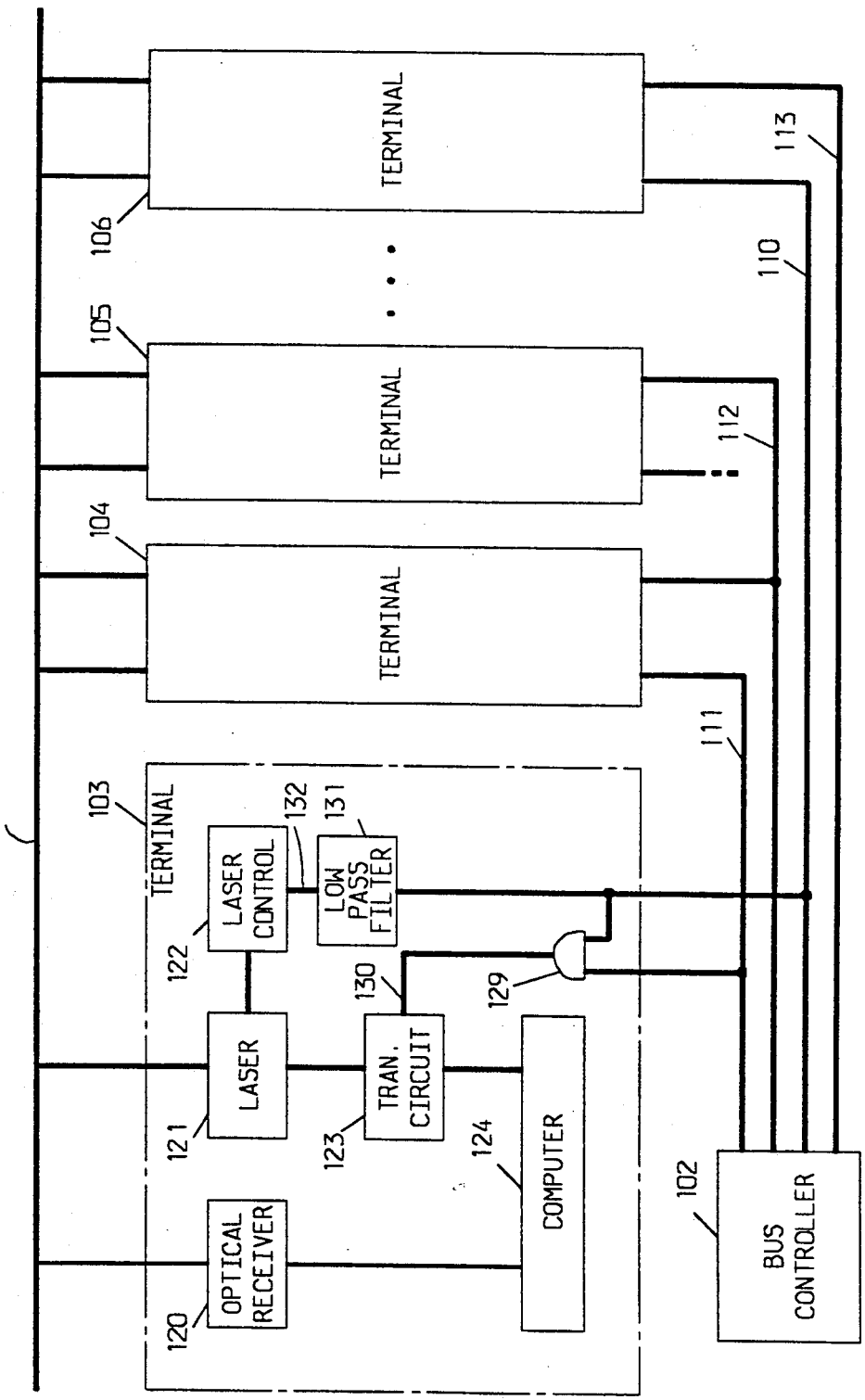
FIG. 1 shows, in block diagram form, one embodiment of the invention.

FIG. 1 illustrates system 100 which implements the invention. System 100 comprises a number of terminals 103 through 106, each capable of transmitting and receiving data to and from optical fiber bus 101 under control of bus controller 102. Each terminal is assigned a time during which it can transmit data on optical fiber bus 101. This time is called the terminal's time slot and is controlled by bus controller 102. The data is transmitted as a packet with each packet having address and data fields. The address field defines which terminal is to receive the packet. In order to receive information from optical fiber bus 101, each terminal's optical receiver examines the address of each packet and transfers those packets addressed to that terminal's computer.

A particular embodiment for terminal 103 is illustrated in block diagram form, and the other terminals are similar. However, terminals 103 through 106 could be a variety of data and communication devices and could communicate speech as well as data. Terminal 103 receives data from optical fiber bus 101 via optical receiver 120, and this data is then transferred to computer 124. The lattter computer communicates data to optical fiber bus 101 via transmit circuit 123 and laser 121. AND gate 129 is responsive to signals transmitted on conductors 110 and 111 to enable transmit circuit 123 via a signal transmitted via conductor 130. Transmit circuit 123 is responsive to the signal on conductor 130 to enable computer 124 to transfer data via transmit circuit 123 to laser 121. Low pass filter 131 via laser control 122 controls whether laser 121 is in the biased or off state. Laser 121 is toggled between the on state and biased state by data received from transmit control 123.

Figure 2:
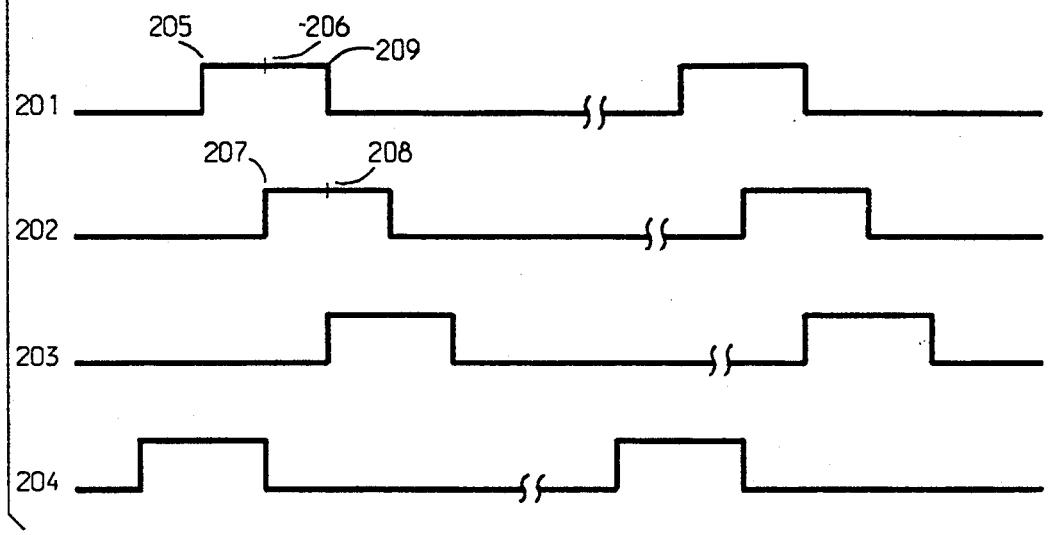
FIG. 2 is a diagram defining the signals generated by the bus controller of FIG. 1.

Bus controller 102 enables each of the terminals to transmit data on optical fiber bus 101 in accordance with the timing diagram illustrated in FIG. 2. Timing signals 201 through 204 are transmitted on conductors 110 through 113, respectively. The latter conductors are shown in FIG. 1. Terminal 103 is responsive to timing signals 201 so that, at time 205, low pass filter 131 via laser control 122 starts to transfer laser 121 from the off state to the biased state. At time 206, AND gate 129 is responsive to signals on conductors 111 and 110 to transmit a signal via conductor 130 to transmit circuit 123. In response to the latter signal, transmit circuit 123 is enabled to transfer data received from computer 124 to laser 121 for transmission on optical fiber bus 101. While terminal 103 is transmitting data on optical fiber bus 101, the laser control of terminal 104 is responsive to the signal on conductor 111 to enable that terminal's laser control to place that terminal's laser in the biased state at time 207. At time 209, low pass filter 131 starts via laser control 122 to transfer laser 121 from the biased state to the off state. Terminal 104's transmit circuit is then enabled at time 208 to allow data from that terminal's computer to be transferred to optical fiber bus 101. Similarly, terminals 105 through 106 are enabled in the same sequential manner.

Figure 6:
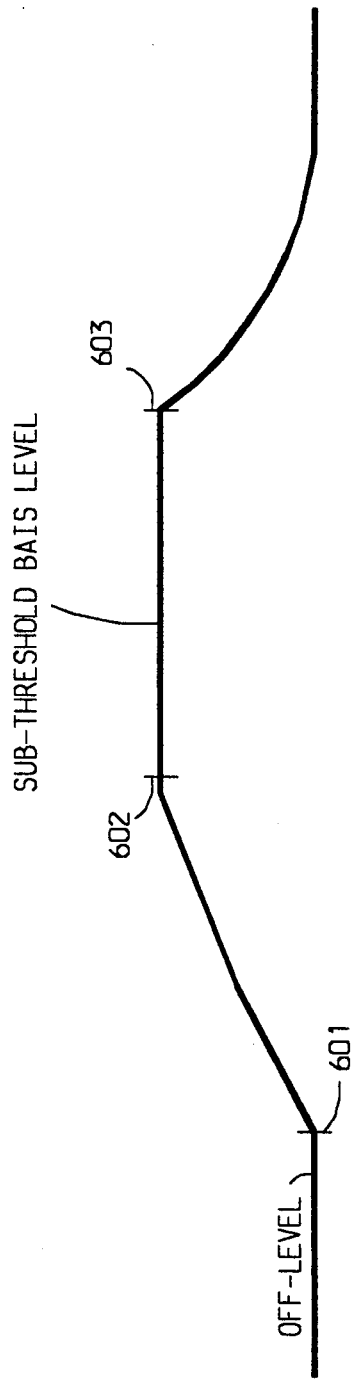
FIG. 6 is a diagram illustrating the output of low pass filter 131 of FIG. 1.

The output on conductor 132 to low pass filter 131 in response to timing signals 201 is illustrated in FIG. 6. In the latter figure, times 601, 602, and 603 correspond to times 205, 206, and 209, respectively. Low pass filter 131 controls laser control 122 so that laser 121 has a smooth transition to and from the biased and off states. This assures that there are no abrupt additions or subtractions of light power on to or off of optical fiber bus 101 which could adversely effect the performance of an optical receiver in another terminal.

Computer 124 receives data from optical fiber bus 101 via path 125, optical receiver 120, and conductor 114. Terminals 104, 105, and 106 transmit and receive data to and from optical fiber bus 101 via pairs 116 and 117, 118 and 119, and 120 and 121, respectively.

Laser control 122 may advantageously be Model CD2140 manufactured by the Meret Corp. Laser 121 may advantageously be Model ML4102A manufactured by the Mitsubishi Corp.

Figure 3:
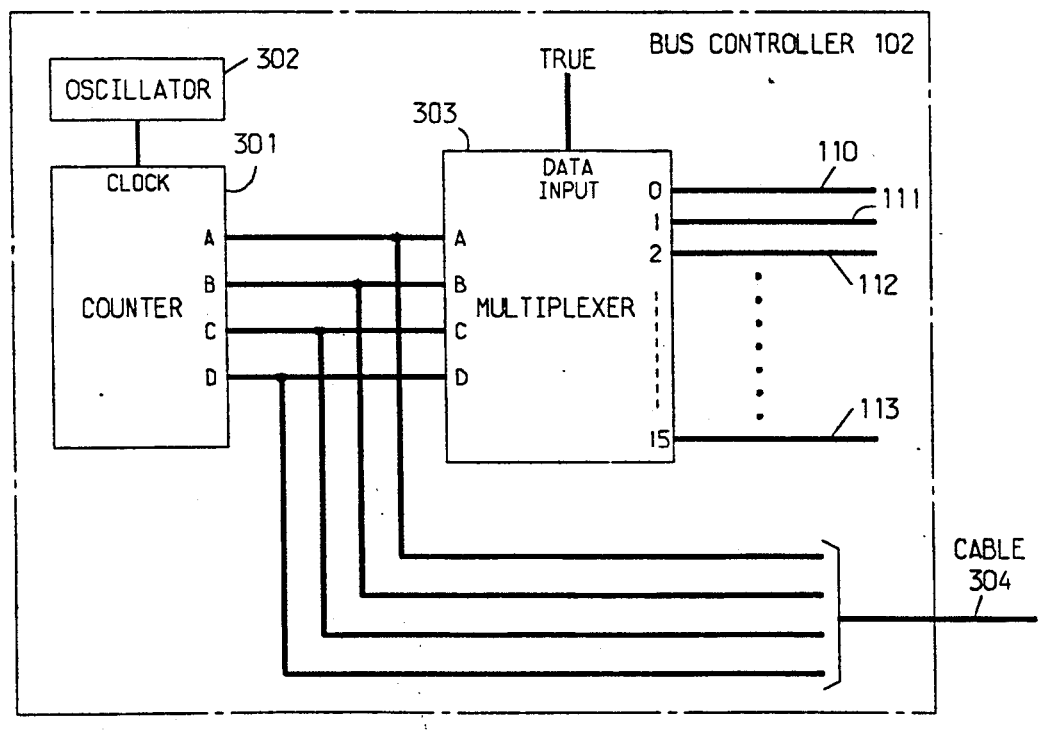
FIG. 3 illustrates, in block diagram form, the bus controller of FIG. 1.

FIG. 3 illustrates, in greater detail, bus controller 102 of FIG. 1. Advantageously, bus controller 102 is shown as being able to control 16 terminals but it would be readily apparent to one skilled in the art to expand the circuit shown to control more terminals. Counter 301 is a four bit binary counter that is responsive to clock signals from oscillator 302 to count from "0" to "15" before recycling back to "0". Multiplexer 303 is responsive to the output of counter 301 to select and transfer a signal received on the data input terminal to an output terminal designated by the output of counter 301. For example, if the output of counter 301 is a "0", multiplexer 303 transfers the signal received on the data input terminal to the "0" output terminal which is connected to conductor 110. A logical "true" is connected to the data input terminal of multiplexer 303. If counter 301 and multiplexer 302 were logic circuits from the TTl family of logic circuits, the logical "true" would be 5 volts. Bus controller 102 also transmits the time slot information in binary form on cable 304.

Figure 4:
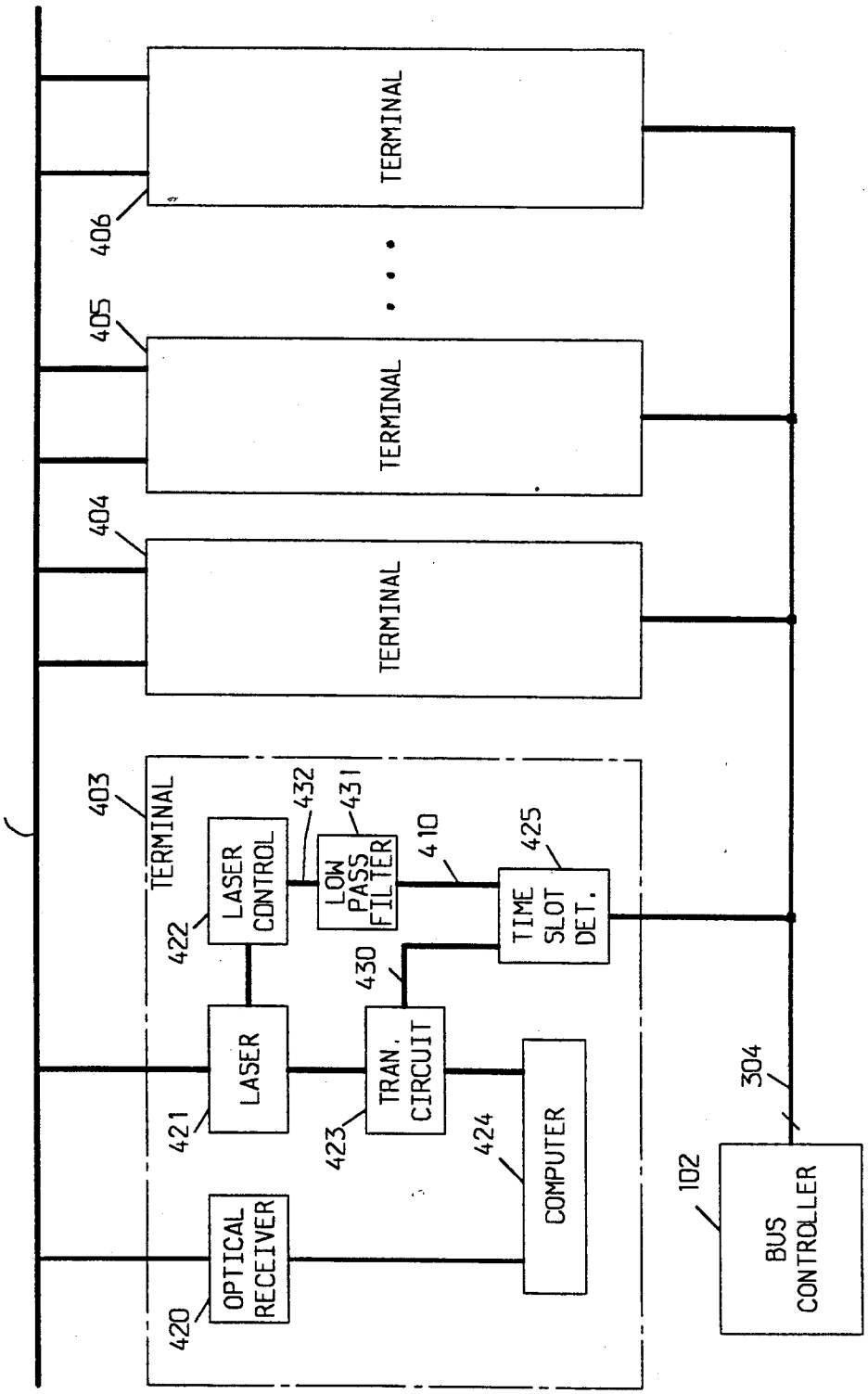
FIG. 4 illustrates, in block diagram form, another embodiment of the invention.

FIG. 4 illustrates system 400 which is another embodiment of the invention. System 400 functions in a manner similar to System 100 with the exception that the time slot information is communicated to terminals 403 through 406 in a different manner than that used in system 100 to communicate the time slot information to terminals 103 through 106. Blocks 420 through 424 and 431 function in the same manner as blocks 120 through 124 and 131 of FIG. 1. Time slot detector 425 is responsive to the time slot information transmitted on cable 304 from bus controller 102 to generate timing signals on conductors 410 and 430 identical to those signals generated on conductors 130 and 132 of FIG. 1. Terminals 404 through 406 are similar in design to terminal 403.

Figure 5:
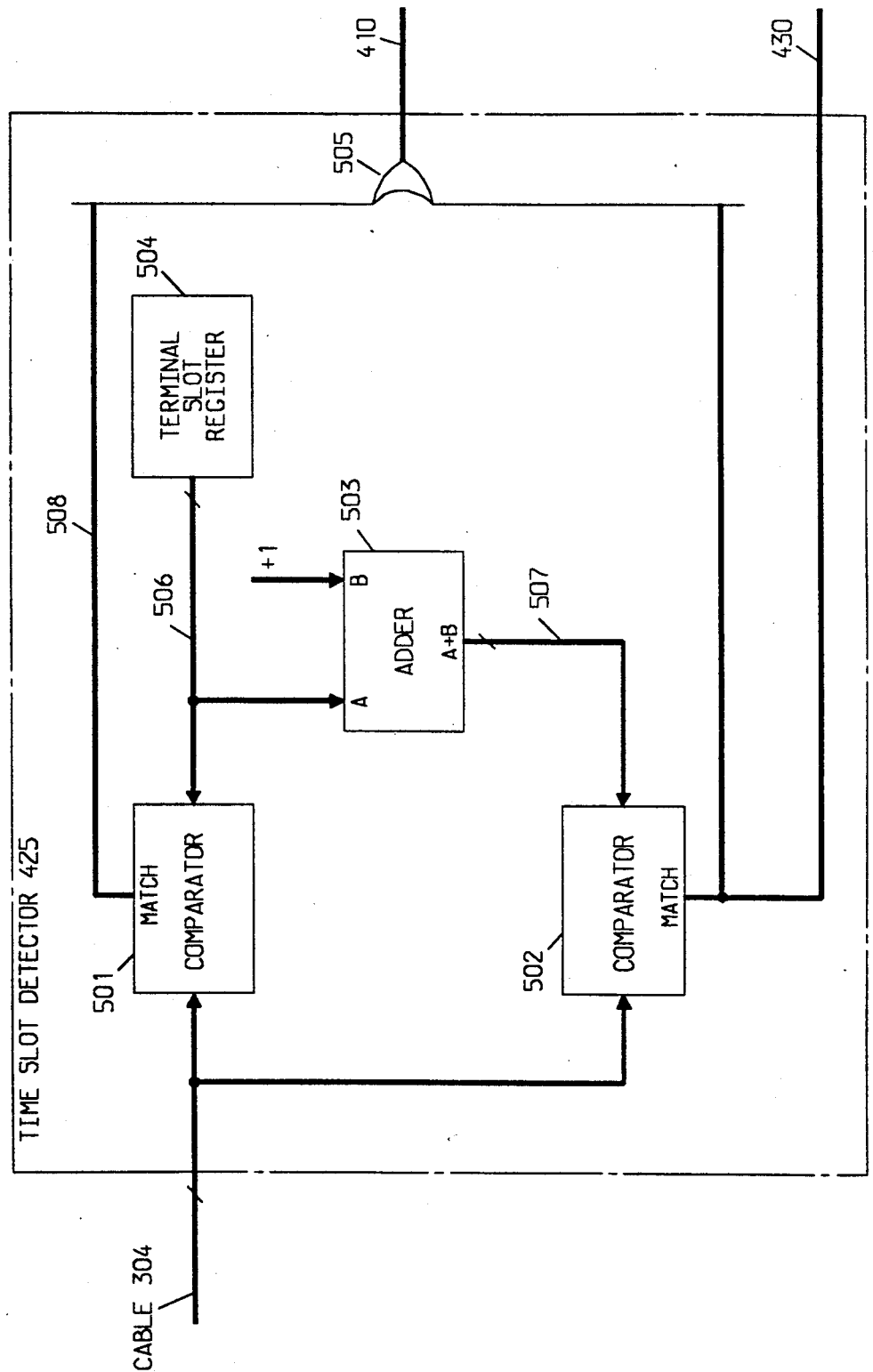
FIG. 5 illustrates, in block diagram form, the time slot detector of FIG. 4.

FIG. 5 illustrates, in greater detail, time slot detector 425. The latter detector is responsive to time slot information transmitted on cable 304 to detect terminal 403's time slot and the immediately preceding time slot which is the time slot for terminal 406. Comparator 502 detects terminal 403's time slot and comparator 501 detects the immediately preceding time slot. When either comparator detects a match, it transmits a signal from its match output terminal. OR gate 505 is responsive to either comparator transmitting a signal from its match output terminal to transmit a signal on conductor 410 which causes laser control 422 to enable laser 421 to the biased state. The signal from comparator 502's match output terminal is transmitted on conductor 430 and enables transmit circuit 423 to transfer data from computer 424 to laser 421.

Comparator 501 compares the time slot information received via cable 304 with the contents of terminal slot register 504. The latter contents define the time slot number immediately preceding the time slot to which terminal 403 is assigned. Register 504 advantageously is a set of manual switches into which the desired time slot number can be entered. However, it would be apparent to one skilled in the art that computer 424 could load such a register or that methods could be devised such that this register could be loaded by a modified bus controller using well known techniques. Adder 503 adds a "+1" to the contents of register 504 which are communicated on cable 506 resulting in the time slot number to which terminal 403 is assigned being transmitted via cable 507 to comparator 502. The latter comparator is responsive to the information cables 304 and 507 to detect the occurrence of terminal 403's time slot. Upon detecting that time slot, comparator 502 enables transmit circuit 423 via conductor 430. In addition, comparator 502 continues to enable laser control 422 via conductor 430, OR gate 505, and conductor 410.

While specific embodiments of the invention have been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Other arrangements may be devised by those skilled in the art without departing from the spirit and the scope of the invention.

I claim:

1. Apparatus for controlling a plurality of terminals each having a transmitter interconnected to an optical fiber bus, comprising:

means for generating time slot numbers defining each time slot as each occurs;

one of said plurality of terminals comprises a first means for detecting the time slot defining the data transmission time during which said one of said plurality of said terminals' transmitter is to communicate data to said bus in response to said time slot number signals;

a second means for detecting the immediately preceding time slot to said time slot for data transmission in response to said time slot number signals;

means responsive to said second detecting means detecting said immediately preceding time slot for starting a transfer of said one of said plurality of said terminals' transmitter from off state to said sub-threshold bias state whereby said one of said plurality of said terminals' transmitter reaches said sub-threshold bias state when said time slot for data transmission occurs;

means responsive to a detection of said time slot for data transmission for controlling said one of said plurality of said terminals' transmitter to be in said sub-threshold bias state and an on state for the transmission of data; and said first detecting means further responsive to said time slot number signals for starting a transfer of said one of said plurality of said terminals's transmitter from said sub-threshold bias state to said off state at the end of said time slot for data transmission whereby said one of said plurality of said terminals' transmitter reaches said off state in the time slot immediately following said time slot for data transmission.

2. The apparatus of claim 1 wherein time slot number signals defines each time slot as each occurs and said decoding means comprises a first means for detecting the time slot during which said one of said plurality of said terminals' transmitter is to communicate data to said bus in response to said time slot number signals; and a second means for detecting the immediately preceding time slot to said time slot during which said one of said plurality of said terminals' transmitter is to communicate data to said bus in response to said time slot number signals.

3. The apparatus of claim 2 wherein said second detecting means comprises means for storing a time slot number equal to one less than the time slot number defining the time slot to which said one of said plurality of said terminals is assigned; and means for comparing said time slot number signals with the stored time slot number to detect said immediately preceding time slot.

4. The apparatus of claim 3 wherein the first detecting means comprises means for adding one to said stored time slot number to generate an incremented time slot number, and means for comparing said incremented time slot number with said time slot number signals to detect said one of said plurality of said terminals' time slot.

5. The apparatus of claim 4 wherein each of said plurality of said terminals' transmitter is a laser.

6. The apparatus of claim 4 wherein each of said plurality of said terminals' transmitter is a light emitting diode.

7. A method for controlling a plurality of terminals each having a transmitter interconnected to an optical fiber bus, comprising:

generating time slot numbers defining each time slot as each occurs;

detecting the time slot defining the data transmission time during which said one of said plurality of said terminals' transmitter to communicate data to said bus in response to said time slot number signals;

detecting the immediately preceding time slot to said time slot for data transmission in response to said time slot number signals;

starting a transfer in response to detection of said immediately preceding time slot of said one of said plurality of said terminals' transmitter from an off state to a sub-threshold bias state whereby said one of said plurality of said terminals' transmitter reaches said sub-threshold bias state when said time slot for data transmission occurs;

controlling said one of said plurality of said terminals' transmitter in response to detection of said time slot for data transmission to be in said sub-threshold bias state and an on state for the transmission of data; and detecting the end of said time slot for data transmission to start a transfer of said one of said plurality of said terminals' transmitter from said sub-threshold bias state to said off state whereby said one of said plurality of said terminals' transmitter reaches said off state in the time slot immediately following said time slot for data transmission.

8. The method of claim 7 wherein time slot number signals defines each time slot as each occurs and said decoding step comprises a step of first detecting the time slot during which said one of said plurality of said terminals' transmitter is to communicate data to said bus in response to said time slot number signals; and a step of second detecting the immediately preceding time slot to said time slot during which said one of said plurality of said terminals' transmitter is to communicate data to said bus in response to said time slot number signals.

9. The method of claim 8 the second detecting step comprises the steps of storing a time slot number equal to one less than the time slot number defining the time slot to which said one of said plurality of said terminals is assigned; and comparing said time slot number signals with the stored time slot number to detect said immediately preceding time slot.

10. The method of claim 9 wherein the first detecting step comprises a step of adding one to said stored time slot number to generate an incremented time slot number; and comparing said incremented time slot number with said time slot number signals to detect said one of said plurality of said terminals' time slot.

11. The method of claim 10 wherein each of said plurality of said terminals' transmitter is a laser.

12. The method of claim 10 wherein each of said plurality of said terminals' transmitter is a light emitter diode.

* * * * *